US011757939B2

(12) United States Patent
Jubilee et al.

(10) Patent No.: US 11,757,939 B2
(45) Date of Patent: Sep. 12, 2023

(54) NETWORK-ASSISTED SECURE DATA ACCESS

(71) Applicant: AT&T Mobility II LLC, Atlanta, GA (US)

(72) Inventors: Effendi Jubilee, Gaithersburg, MD (US); Ming-Ju Ho, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 455 days.

(21) Appl. No.: 16/931,508

(22) Filed: Jul. 17, 2020

(65) Prior Publication Data
US 2022/0021706 A1    Jan. 20, 2022

(51) Int. Cl.
*H04L 29/00*    (2006.01)
*H04L 9/40*    (2022.01)

(52) U.S. Cl.
CPC ............ *H04L 63/20* (2013.01); *H04L 63/083* (2013.01); *H04L 63/102* (2013.01); *H04L 63/105* (2013.01); *H04L 63/123* (2013.01)

(58) Field of Classification Search
CPC ..... H04L 63/20; H04L 63/083; H04L 63/102; H04L 63/105; H04L 63/123; H04L 63/08
See application file for complete search history.

(56) References Cited

U.S. PATENT DOCUMENTS

| 7,697,920 | B1* | 4/2010 | McClain ................ G06F 21/43 |
| | | | 455/410 |
| 9,386,009 | B1* | 7/2016 | Marion ................ H04L 63/083 |
| 10,321,310 | B1* | 6/2019 | Scheer ................ H04L 63/061 |
| 10,764,752 | B1* | 9/2020 | Avetisov ............... H04W 12/08 |
| 11,240,239 | B2* | 2/2022 | Hamlin ................ H04L 63/102 |
| 11,496,895 | B2* | 11/2022 | Soryal ................... H04W 4/026 |
| 2009/0167497 | A1* | 7/2009 | Kim ........................ H04L 63/08 |
| | | | 340/10.1 |
| 2012/0324233 | A1* | 12/2012 | Nguyen ................ H04L 9/0866 |
| | | | 713/176 |
| 2013/0111208 | A1* | 5/2013 | Sabin ..................... G06F 21/36 |
| | | | 713/176 |

(Continued)

Primary Examiner — Don G Zhao
(74) Attorney, Agent, or Firm — Hartman & Citrin LLC

(57) ABSTRACT

The concepts and technologies disclosed herein provide a network-assisted secure access ("NASA") application that is installed on a user device. The NASA application can enhance current multi-factor authentication processes to prevent unauthorized access by leveraging mobile connectivity data. The enhanced two-factor authentication process is made seamless and transparent to the user by authenticating the mobile connectivity data with data known to the mobile network that serves the user device. The mobile connectivity data can include network-determined location, cell identifier ("cell ID"), Internet protocol ("IP") address, a globally unique temporary identifier ("GUTI"), combinations thereof, and the like. Additionally or alternatively, one or more user profiles (e.g., user-defined and/or social media profile(s)) can be used to further enhance security. The enhanced two-factor authentication process can be executed at initial access to establish a secure connection and/or at any time during an established connection to ensure the connection remains secure.

20 Claims, 7 Drawing Sheets

(56) References Cited

U.S. PATENT DOCUMENTS

| | | | |
|---|---|---|---|
| 2014/0245015 A1* | 8/2014 | Velamoor | H04L 63/10 |
| | | | 713/171 |
| 2015/0373023 A1* | 12/2015 | Walker | G06F 21/6218 |
| | | | 726/3 |
| 2016/0241547 A1* | 8/2016 | Nguyen | H04L 63/0442 |
| 2017/0041296 A1* | 2/2017 | Ford | G06F 21/64 |
| 2017/0148009 A1* | 5/2017 | Perez Lafuente | H04L 63/20 |
| 2017/0280323 A1* | 9/2017 | Dennis | G06Q 20/32 |
| 2022/0046001 A1* | 2/2022 | Li | H04L 63/0853 |
| 2022/0312270 A1* | 9/2022 | Raleigh | H04L 69/18 |

\* cited by examiner

NETWORK-ASSISTED SECURE DATA ACCESS

BACKGROUND

Authentication is widely used to provide secure access to data. The most common authentication scheme is a simple username and password. With the large number of accounts, websites, applications, and other digital data to which access is controlled by username and password combinations, many users simply reuse their username and/or password. This creates an opportunity for malicious attackers to identify passwords and freely access a user's digital data. In recent years, multi-factor authentication has become increasingly popular. In addition to something a user knows (e.g., a password), something the user has (e.g., an identifier badge or a cryptographic key) or something the user is (e.g., a fingerprint or other biometric data) can be used to strengthen protection against malicious attacks. A popular two-factor authentication process requires a user to enter their username and password to access a website and then a separate code or token is delivered to the user via a text message, a phone call, authenticator application, or other out-of-band mechanism. The user enters this code/token into the website to verify their identity and gain access to the website. An attacker can still break a two-factor authentication process by intercepting the code/token either when the user initially accesses the website or during the connection to the website.

SUMMARY

Concepts and technologies disclosed herein are directed to network-assisted secure data access. According to one aspect disclosed herein, a user device can include a processor that can execute a network-assisted secure access application. The user device can obtain first authentication data associated with a user who is attempting to access a secure resource. The first authentication data can include a username and password, although other authentication data is contemplated. The user device can generate a message directed to the secure resource. The message can include the first authentication data and an indicator to notify the secure resource that a network-assisted secure data access service will be used to assist in providing the user device secure access to the secure resource. The secure resource can verify the first authentication data. The user device can provide the message to the secure resource and can receive a notification that the first authentication data has been verified by the secure resource. The user device can obtain mobile connectivity data associated with the user device. The user device can generate an authentication request that includes the mobile connectivity data and can send the authentication request to a security server, which can validate the mobile connectivity data against a fraud database. The user device can receive, from the security server, a security key that indicates that the security server has verified the data against the fraud database. The security server also provides the security key to the secure resource. The user device can prompt the user to input the second authentication data and provide the second authentication data to the secure resource. The user device can generate a verification request that includes the security key. The user device can provide the verification request to the security server. The security server can verify that the security key is valid and can provide an acceptance notification to the secure resource to notify the secure resource to accept the second authentication data and grant the user device access to the secure resource.

The secure resource can store any data the user desires to access that is stored by or for the secure resource (e.g., on-site or off-site storage). In some embodiments, the secure resource is a bank website through which the user can access one or more financial accounts (e.g., checking, savings, retirement accounts, and the like). In other embodiments, the secure resource can include a health provider website through which the user can access appointment data, prescriptions, health history, vaccinations, and the like. In some other embodiments, the secure resource can include a social media web site (e.g., FACEBOOK, TWITTER, INSTAGRAM, SNAPCHAT, YOUTUBE, and the like) through which the user can access social media content for one or more social media accounts. Although the secure resource is primarily described herein as a website, the secure resource can include any supporting infrastructure such as one or more servers that serve the website.

In some embodiments, the network-assisted secure access application is a stand-alone application that can be downloaded (e.g., from an application marketplace) and installed on the user device. In some other embodiments, the network-assisted secure access application can be part of another application or an operating system. For example, the network-assisted secure access application can be implemented as a widget, plug-in, extension, or the like of one or more applications.

In some embodiments, in addition to mobile connectivity data, the user device can obtain user device data and/or a user profile and can include this data in the authentication request. The user device data and/or the user profile also can be verified by the security server. The user device data can include a device name (e.g., APPLE IPHONE 11 or the like), a device model number, a device software version number, device operating system data, device International Mobile Equipment Identity ("IMEI"), device serial number, combinations thereof, and the like. In some embodiments, the user profile data can include biometric data that uniquely identifies the user based upon biometric data. The biometric data can be derived from any biometric modality, some examples of which include, but are not limited to, fingerprints, facial patterns, voice patterns, iris scans, DNA, and the like. In some other embodiments, the user profile can include a social media profile that can include data from one or more social media platforms.

In some embodiments, the user device can obtain updated mobile connectivity data, updated user device data, and/or an updated user profile. The user device can provide this updated data to the security server for validation. The security server can determine whether the updated data can be validated. If the updated data can be validated, the security server can notify the secure resource to maintain a connection with the user device. If the updated data cannot be validated, the security server can notify the secure resource to disconnect the connection with the user device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein provide a network-assisted secure access ("NASA") application that is installed on a user device. The NASA application can enhance current multi-factor authentication processes to prevent unauthorized access by leveraging mobile connectivity data associated with the user device. The enhanced two-factor authentication process is made seamless and transparent to the user by authenticating mobile connectivity data provided by the user device with mobile connectivity data known to a mobile network that serves the user device. The mobile connectivity data can include a network-determined location, a cell identifier ("cell ID"), an Internet protocol ("IP") address, a globally unique temporary identifier ("GUTI"), combinations thereof, and the like. Additionally or alternatively, one or more user profiles (e.g., user-defined and/or social media profile(s)) can be used to further enhance security. The enhanced two-factor authentication process can be executed at initial access to establish a secure connection and/or at any time during an established connection to ensure the connection remains secure.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
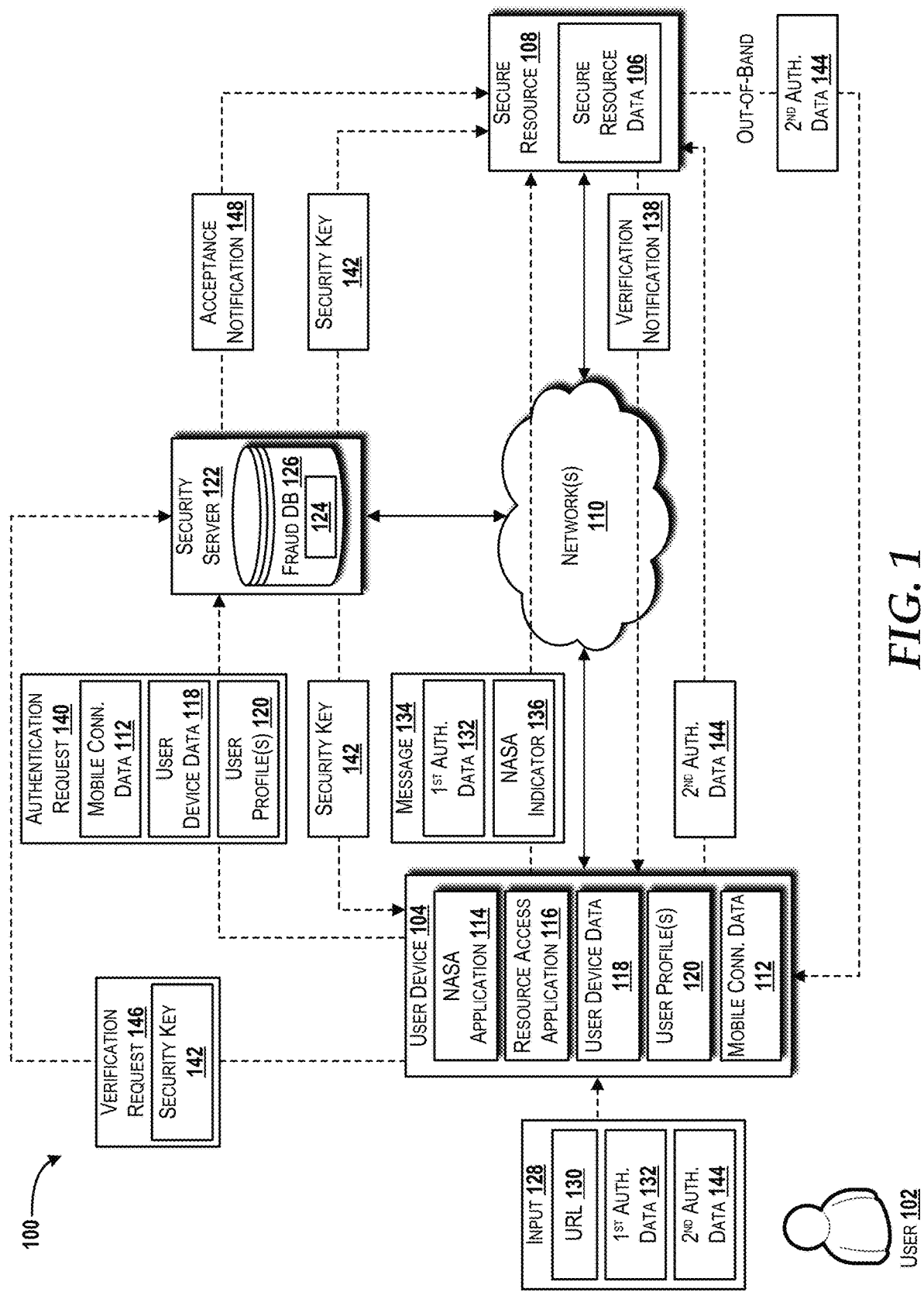
FIG. 1 is a block diagram illustrating aspects of an illustrative operating environment for various concepts and technologies disclosed herein.

Turning now to FIG. 1, an operating environment 100 in which embodiments of the concepts and technologies disclosed herein will be described. The operating environment 100 includes a user 102 associated with a user device 104 through which the user 102 can access secure resource data 106 from a secure resource 108. The user device 104 can be or can include any device that is capable of communicating with the secure resource 108 via one or more networks 110. The networks 110 can include one or more mobile telecommunications networks, one or more wireline networks, one or more public data networks (e.g., the Internet), other networks described herein, combinations thereof, and the like. An example embodiment of the network 110 is illustrated and described herein with reference to FIG. 6.

In some embodiments, the user device 104 is a mobile device with mobile telecommunications capabilities such as to access one or more mobile telecommunications networks (embodied in the illustrated networks 110). As such, the user device 104 can be associated with mobile connectivity data 112 that can be used in accordance with the concepts and technologies disclosed herein to authenticate and verify the user device 104 to the secure resource 108, as will be described in greater detail below. The mobile connectivity data 112 can include a system information block ("SIB") mapping, SIBType1 ("SIB1"), a camped cell identifier, a mobile country code ("MCC"), a mobile network code ("MNC"), a tracking area code ("TAC"), Evolved Universal Terrestrial Radio Access ("E-UTRA") absolute radio frequency channel number ("EARFCN"), Internet protocol ("IP") address, globally unique temporary identifier ("GUTI"), user mobility subscription profile, granted multiple-input and multiple-output ("MIMO") profile(s), granted service profiles, Carrier IQ ("CIQ") profiles, combinations thereof, and the like.

The user device 104 can execute, via one or more processors (best shown in FIGS. 4 and 5), a network-assisted secure access ("NASA") application 114 and a resource access application 116. In some embodiments, the NASA application 114 is a stand-alone application that can be downloaded (e.g., from an application marketplace) and installed on the user device 104. In some other embodiments, the NASA application 114 can be part of another application, such as the resource access application 116, or an operating system (best shown in FIG. 5). The NASA application 114 can be implemented as a widget, plug-in, extension, or the like of another application, such as the resource access application 116. For example, the NASA application 114 may be an extension of the resource access application 116 (e.g., embodied as a web browser application). The resource access application 116 can also include a standalone application associated with the secure resource 108. For example, the resource access application 116 may include a standalone application for accessing the secure resource 108 (e.g., a banking application for accessing a bank server or a social media application for accessing a social media platform).

The secure resource data 106 can include any data the user 102 desires to access that is stored by or for the secure resource 108 (e.g., on-site or off-site storage). For example, the secure resource data 106 can include financial data and the secure resource 108 can be a bank website through which the user 102 can access one or more financial accounts (e.g., checking, savings, retirement accounts, and the like). As another example, the secure resource data 106 can include health data and the secure resource 108 can be a health provider website through which the user 102 can access appointment data, prescriptions, health history, vaccinations, and the like. The secure resource data 106 can include social media data and the secure resource 108 can be a social media website (e.g., FACEBOOK, TWITTER, INSTAGRAM, SNAPCHAT, YOUTUBE, and the like) through which the user 102 can access social media content for one or more social media accounts. The secure resource data 106 and the secure resource 108 are not limited to any particular data or resource type. As such the examples provided herein should not be construed as being limiting in any way. Although the secure resource 108 is primarily described herein as a website, the secure resource 108 can include any supporting infrastructure such as one or more servers that serve the website. It should be understood that the same or different servers operating as part of the secure resource 108 may serve the secure resource data 106 to the other application(s) 116 executed by the user device 104.

The illustrated user device 104 also includes user device data 118 and one or more user profiles 120. The user device data 118 and/or the user profile(s) 120 can be used in combination with the mobile connectivity data 112 in accordance with the concepts and technologies disclosed herein to authenticate and verify the user device 104 to the secure resource 108, as will be described in greater detail below. The user device data 118 can include a device name (e.g., APPLE IPHONE 11 or the like), a device model number, a device software version number, device operating system data, device International Mobile Equipment Identity ("IMEI"), device serial number, combinations thereof, and the like. In some embodiments, the user profile(s) 120 can include a biometric profile that uniquely identifies the user 102 based upon biometric data. The biometric data can be derived from any biometric modality, some examples of which include, but are not limited to, fingerprints, facial patterns, voice patterns, iris scans, DNA, and the like. In some other embodiments, the user profile(s) 120 can include a social media profile that include data from one or more social media platforms.

The NASA application 114 can communicate with a security server 122 to authenticate the mobile connectivity data 112 alone or in combination with the user device data 118 and/or the user profile(s) 120. The security server 122, for example, can validate the mobile connectivity data 112 received from the user device 104 based upon network mobile connectivity data 124 shared by the network(s) 110 and stored, according to embodiments, in a fraud database 126. The security server 122 can validate the mobile connectivity data 112 during setup of a secure connection between the user device 104 and the secure resource 108, or to maintain the secure connection.

The additional elements shown in FIG. 1 represent communications among the user device 104, the secure resource 108, and the security server 122 via the network(s) 110 in support of establishing a secure connection between the user device 104 and the secure resource 108. These elements will be described in detail below with additional reference FIG. 2. Moreover, although a single user 102, user device 104, secure resource 108, security server 122, and fraud database 126 are shown, those skilled in the art will appreciate implementations with multiple users 102, user devices 104, secure resources 108, security servers 122, and/or fraud databases 126. As such, the illustrated example should not be construed as being limiting in any way.

Figure 2:
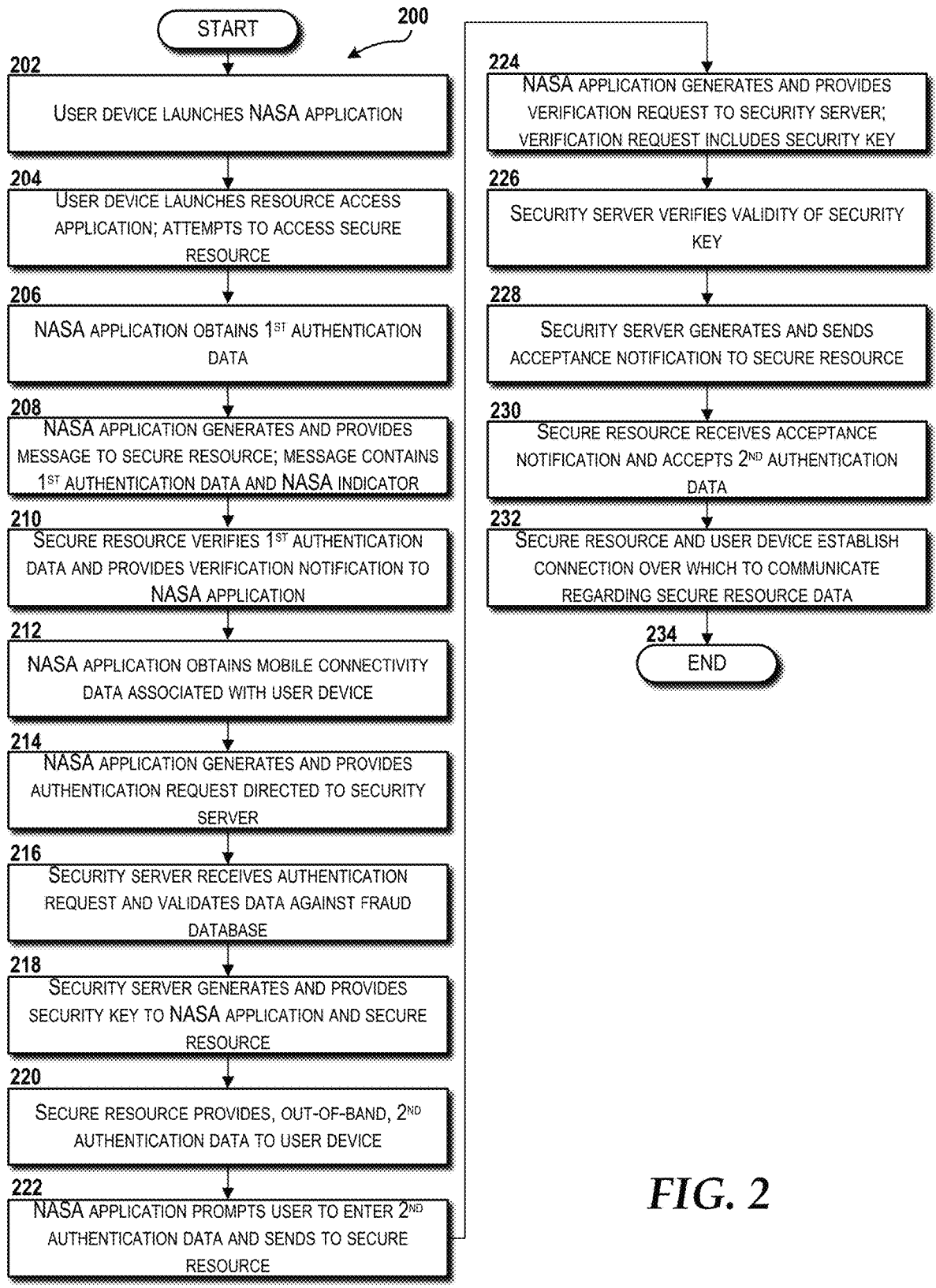
FIG. 2 is a flow diagram illustrating aspects of a method for establishing a secure connection between a user device and a secure resource, according to an illustrative embodiment of the concepts and technologies disclosed herein.

Turning now to FIG. 2 with continued reference to FIG. 1, a flow diagram illustrating aspects of a method 200 for establishing a secure connection between the user device 104 and the secure resource 108 will be described, according to an illustrative embodiment. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the user device 104 launches the NASA application 114. From operation 202, the method 200 proceeds to operation 204. At operation 204, the user device 104 launches the resource access application 116. The resource access application 116 will be described in the method 200 as a web browser application, but may instead be a stand-alone application for accessing the secure resource 108. The resource access application 116 can then attempt to access the secure resource 108. For example, the user 102 may provide, as input 128, a uniform resource locator ("URL") 130 into the resource access application 116 (e.g., a search bar or other user interface element) and the resource access application 116 can access the secure resource 108. The secure resource 108 can prompt the user 102 to enter first authentication data 132, such as a username and password, although other authentication data is contemplated. For example, a user interface may be presented with input fields for a username and a password.

From operation 204, the method 200 proceeds to operation 206. At operation 206, the NASA application 114 obtains the first authentication data 132. In some embodiments, the NASA application 114 is an extension to the resource access application 116, such as a web browser extension. When the secure resource 108 prompts the user 102 to enter the first authentication data 132, the NASA application 114 can receive the input 128. In some embodiments, the NASA application 114 can intercept the input 128 into the resource access application 116. For example, the NASA application 114 can identify the username and password input fields presented on a web page and can obtain the data input into these fields. Alternatively, the NASA application 114 can present a pop-up or other user interface element through which the user 102 can enter the first authentication data 132. The NASA application 114 may obtain the first authentication data 132 in other ways, and as such, the aforementioned examples should not be construed as being limiting in any way.

From operation 206, the method 200 proceeds to operation 208. At operation 208, the NASA application 114 generates a message 134 that includes the first authentication data 132 and a NASA indicator 136. The NASA indicator 136 is used to notify the secure resource 108 that the NASA application 114 will be used to ensure secure access to the secure resource 108. The NASA application 114 then provides the message 134 to the secure resource 108.

From operation 208, the method 200 proceeds to operation 210. At operation 210, the secure resource 108 verifies the first authentication data 132. For example, the secure resource 108 can compare the first authentication data 132 to an authentication database (not shown) to verify the first authentication data 132. After verifying the first authentication data 132, the secure resource 108 can generate and provide a verification notification 138 to the NASA application 114. The verification notification 138 indicates that the first authentication data 132 has been verified and the secure resource 108 is waiting for security clearance from the security server 122.

From operation 210, the method 200 proceeds to operation 212. At operation 212, the NASA application 114 obtains the mobile connectivity data 112 associated with the user device 104. From operation 212, the method 200 proceeds to operation 214. At operation 214, the NASA application 114 generates an authentication request 140. The authentication request 140 can include the mobile connectivity data 112 obtained at operation 212. The authentication request 140 also can include at least a portion of the user device data 118 and/or the user profile(s) 120. Also at operation 214, the NASA application 114 can instruct the user device 104 to send the authentication request 140 to the security server 122.

From operation 214, the method 200 proceeds to operation 216. At operation 216, the security server 122 receives the authentication request 140 from the user device 104. The security server 122 can extract the mobile connectivity data 112 (and at least the portion of the user device data 118 and/or the user profile(s) 120 if included) from the authentication request 140. The security server 122 can validate the mobile connectivity data against the fraud database 126 by comparing the mobile connectivity data 112 to the network mobile connectivity data 124. The method 200 proceeds under the assumption that mobile connectivity data 112 can be validated. If not, the security server 122 may notify the secure resource 108 not to allow the user device 104 access to the secure resource data 106.

From operation 216, the method 200 proceeds to operation 218. At operation 218, the security server 122 generates and sends a security key 142 to the NASA application 114 and the secure resource 108. From operation 218, the method 200 proceeds to operation 220 where the secure resource 108 provides second authentication data 144 to the user device 104. The second authentication data 144 can include an out-of-band security token, such as, for example, a code sent to the user device 104 via a text message (e.g., a short message service message and/or an IP-based message), an e-mail, a telephone call, or a separate authenticator application. From operation 220, the method 200 proceeds to operation 222. At operation 222, the NASA application 114 prompts the user 102 to enter the second authentication data 144. After the NASA application 114 receives the second authentication data 144, the NASA application 114 sends the second authentication data 144 to the secure resource 108. The secure resource 108 saves the second authentication data 144 until the security server 122 notifies the secure resource 108 to accept the second authentication data 144.

From operation 222, the method 200 proceeds to operation 224. At operation 224, the NASA application 114 generates a verification request 146 that includes the security key 142 previously received from the security server 122 in response to the authentication request 140. The NASA application 114 then provides the verification request 146 to the security server 122.

From operation 224, the method 200 proceeds to operation 226. At operation 226, the security server 122 verifies the validity of the security key 142 associated with the verification request 146. In other words, the security server 122 compares the security key 142 received in the verification request 146 to the security key 142 sent to the user device 104 and the secure resource 108 at operation 218. The method 200 proceeds under the assumption that the security key 142 is valid.

From operation 226, the method 200 proceeds to operation 228. At operation 228, the security server 122 generates an acceptance notification 148. The acceptance notification 148 is used to notify the secure resource 108 to accept the second authentication data 144. From operation 228, the method 200 proceeds to operation 230. At operation 230, the secure resource 108 receives the acceptance notification 148 and accepts the second authentication data 144. From operation 230, the method 200 proceeds to operation 232. At operation 232, the secure resource 108 and the user device 104 establish a secure connection over which to communicate regarding the secure resource data 106.

From operation 232, the method 200 proceeds to operation 234. At operation 234, the method 200 can end.

Figure 3:
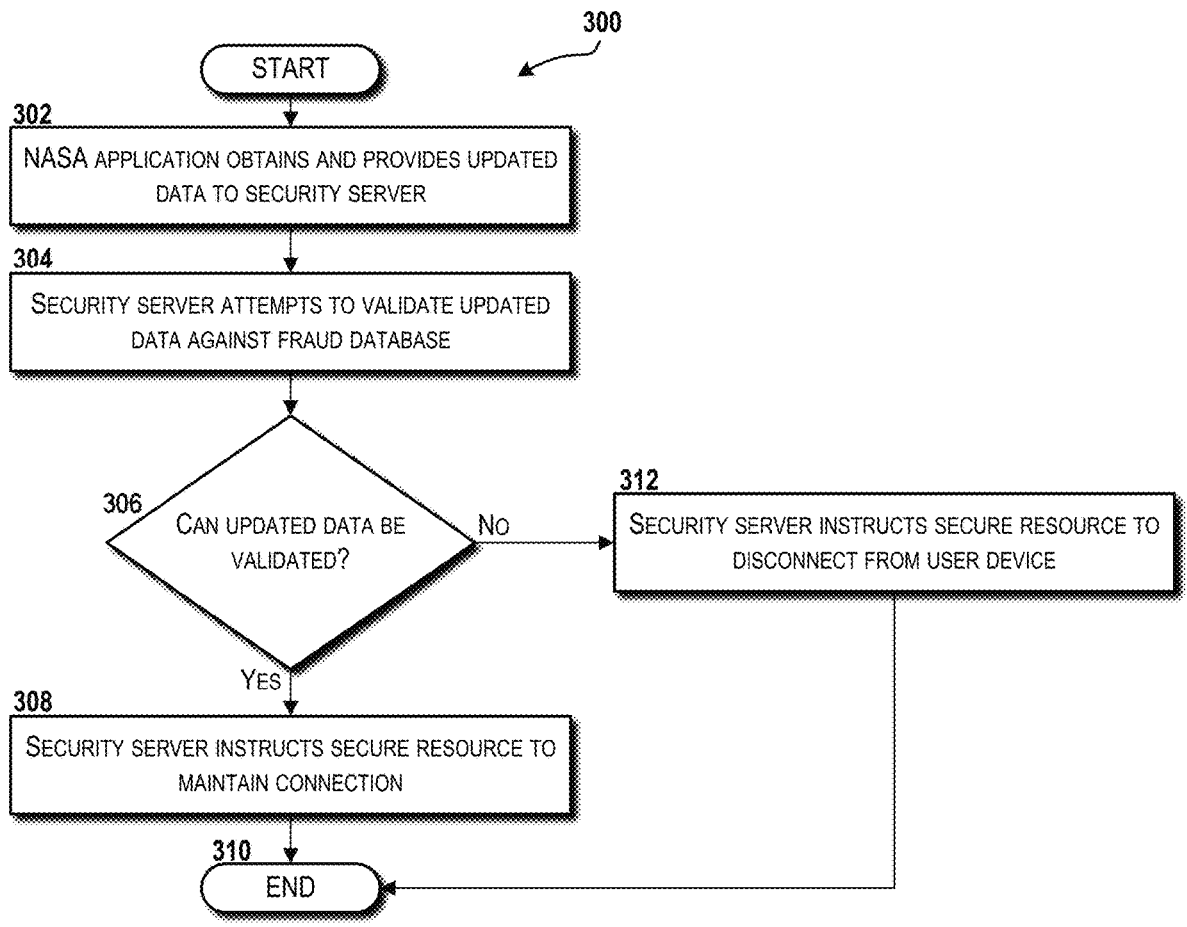
FIG. 3 is a flow diagram illustrating aspects of a method for maintaining the secure connection between the user device and the secure resource, according to an illustrative embodiment of the concepts and technologies disclosed herein.

Turning now to FIG. 3, a flow diagram illustrating aspects of a method 300 for maintaining the secure connection between the user device 104 and the secure resource 108 will be described, according to an illustrative embodiment. The method 300 begins and proceeds to operation 302. At operation 302, the NASA application provides updated data to the security server 122 to maintain the secure connection established in the method 200 described above. This updated data can include the latest mobile connectivity data 112 obtained by the user device 104.

From operation 302, the method 300 proceeds to operation 304. At operation 304, the security server 122 attempts to validate the updated data against the fraud database 126. From operation 304, the method 300 proceeds to operation 306. At operation 306, the security server 122 determines if the updated data can be validated. If the updated data can be validated, such as based on performance of the operations of FIG. 2, the method 300 proceeds to operation 308. At operation 308, the security server 122 instructs the secure resource to maintain the secure connection. From operation 308, the method 300 proceeds to operation 310. The method 300 ends at operation 310. Returning to operation 306, if the updated data cannot be validated, the method 300 proceeds to operation 312. At operation 312, the security server 122 instructs the secure resource to disconnect from the user device 104. From operation 312, the method 300 proceeds to operation 310. The method 300 ends at operation 310.

Figure 4:
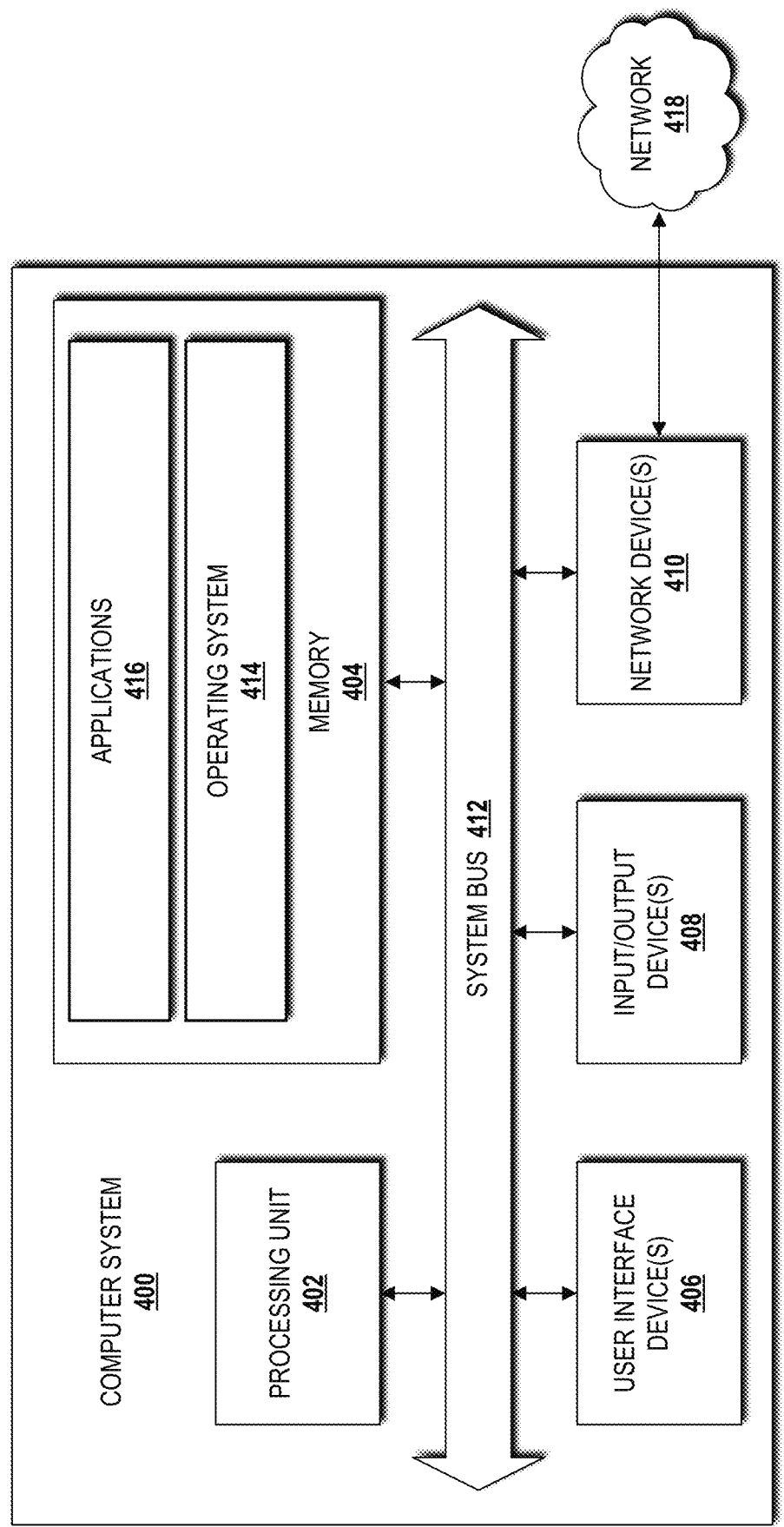
FIG. 4 is a block diagram illustrating an example computer system, according to some illustrative embodiments.

Turning now to FIG. 4, a computer system 400 and components thereof will be described. An architecture similar to or the same as the computer system 400 can be used to implement various systems and/or devices disclosed herein, such as the user device 104, the secure resource 108, and/or the security server 122.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 might be a standard central processor that performs arithmetic and logical operations, a more specific purpose programmable logic controller ("PLC"), a programmable gate array, or other type of processor known to those skilled in the art and suitable for controlling the operation of the computer system 400. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more applications 416. The operating system 414 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 406 may include one or more devices with which a user accesses the computer system 400. The user interface devices 406 may include, but are not limited to, computers, servers, personal digital assistants, telephones (e.g., cellular, IP, or landline), or any suitable computing devices. The I/O devices 408 enable a user to interface with the program modules. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, a touchscreen, or an electronic stylus. Further, the I/O devices 408 may include one or more output devices, such as, but not limited to, a display screen or a printer. An I/O device 408 embodied as a display screen can be used to present data.

The network devices 410 enable the computer system 400 to communicate with a network 418. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a WLAN such as a WI-FI network, a WWAN, a wireless PAN ("WPAN") such as BLUETOOTH, or a wireless MAN ("WMAN"). Alternatively, the network 418 may be a wired network such as, but not limited to, a WAN such as the Internet, a LAN such as the Ethernet, a wired PAN, or a wired MAN.

Figure 5:
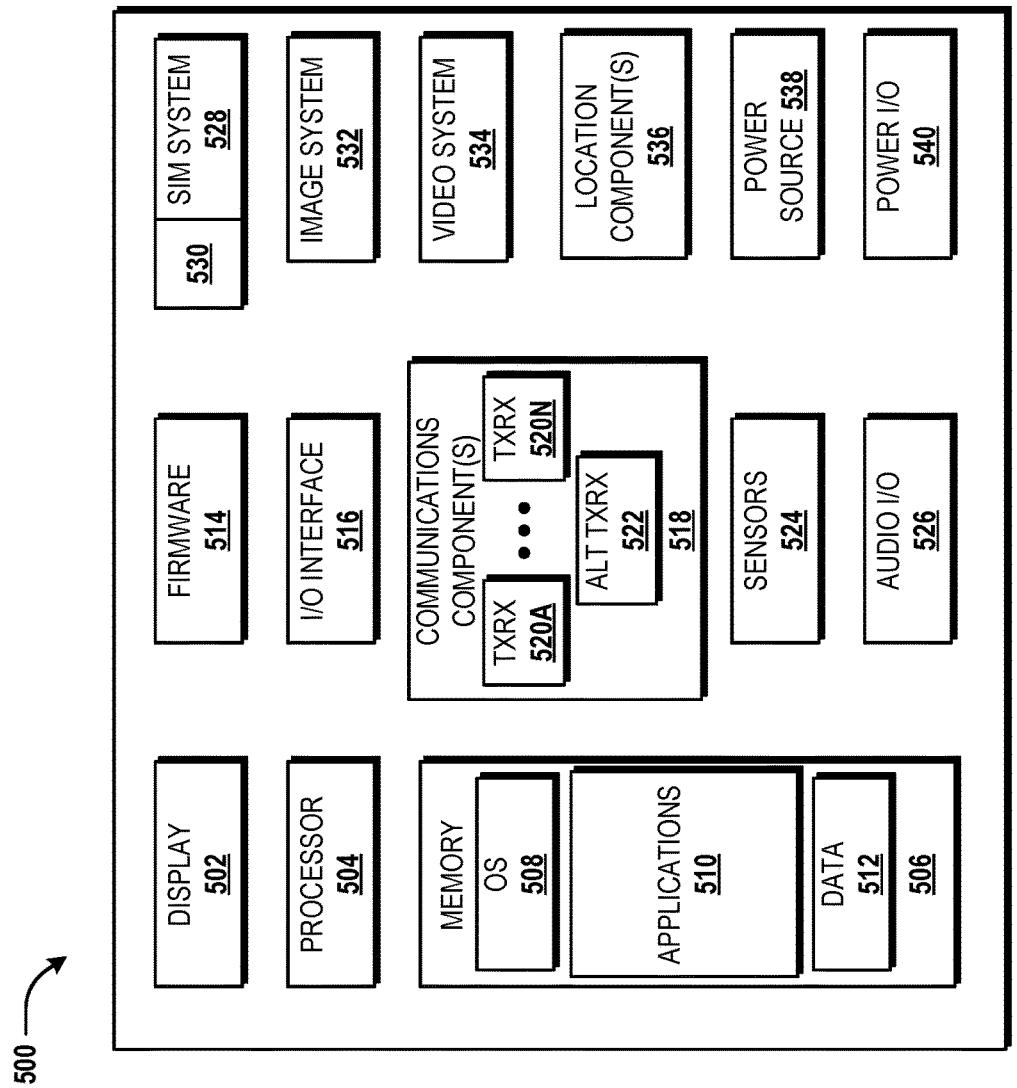
FIG. 5 is a block diagram illustrating an example mobile device, according to an illustrative embodiment.

Turning now to FIG. 5, an illustrative mobile device 500 and components thereof will be described. In some embodiments, the user device 104, the secure resource 108, and/or the security server 122 is/are configured similar to or the same as the mobile device 500. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the network 110, the Internet, or some combination thereof. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 518 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 400 described above with reference to FIG. 4. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
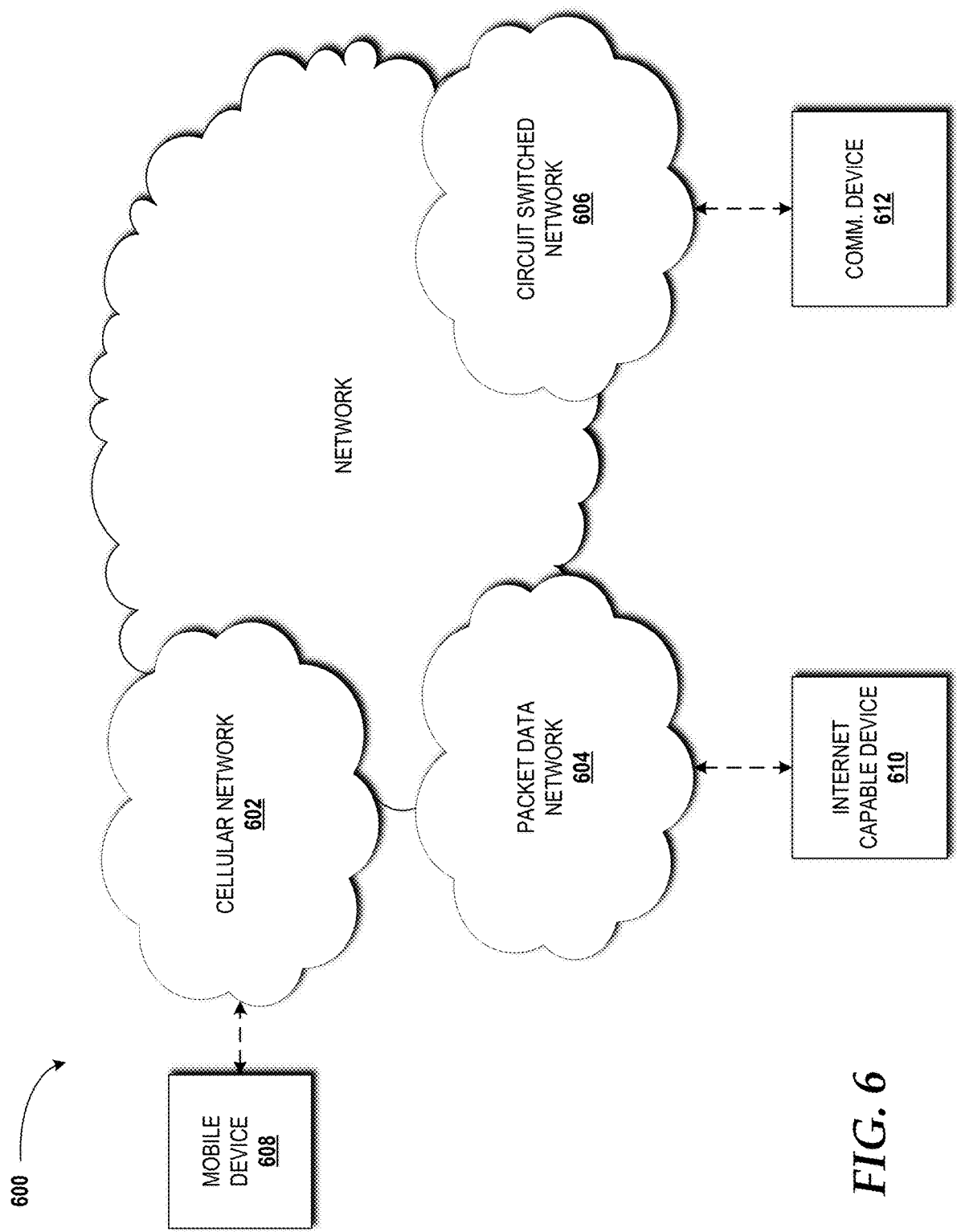
FIG. 6 is a block diagram illustrating an example network, according to an illustrative embodiment.

Turning now to FIG. 6, details of a heterogeneous network 600 are illustrated, according to an illustrative embodiment. In some embodiments, the network(s) 110 is/are configured similar to or the same as the heterogeneous network 600. The heterogeneous network 600 includes a cellular network 602, a packet data network 604, and a circuit switched network 606 (e.g., a public switched telephone network). The cellular network 602 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the user device(s) 124, a cellular telephone, a user equipment, a mobile terminal, a PDA, a laptop computer, a handheld computer, and combinations thereof, can be operatively connected to the cellular network 602. The mobile communications device 608 can be configured similar to or the same as the mobile device 500 described above with reference to FIG. 5.

The cellular network 602 can be configured as a GSM) network and can provide data communications via GPRS and/or EDGE. Additionally, or alternatively, the cellular network 602 can be configured as a 3G Universal Mobile Telecommunications System ("UMTS") network and can provide data communications via the HSPA protocol family, for example, HSDPA, EUL, and HSPA+. The cellular network 602 also is compatible with mobile communications standards such as LTE, or the like, as well as evolved and future mobile standards.

The packet data network 604 includes various systems, devices, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610 such as the user device 104, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Figure 7:
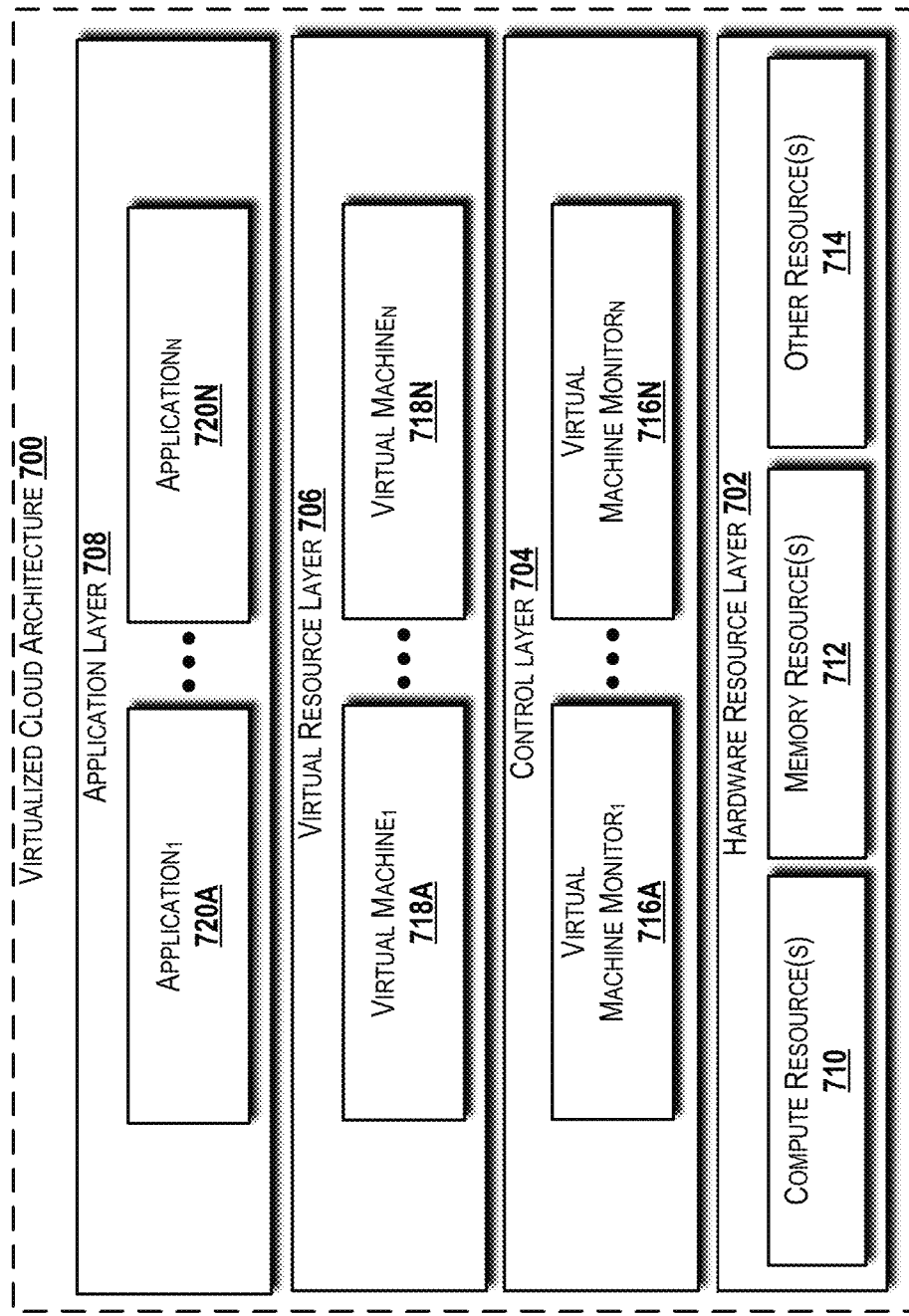
FIG. 7 is a block diagram illustrating a virtualized cloud architecture capable of implementing aspects of the concepts and technologies disclosed herein.

Turning now to FIG. 7, a block diagram illustrating an example virtualized cloud architecture 700 and components thereof will be described, according to an exemplary embodiment. In some embodiments, the virtualized cloud architecture 700 can be utilized to implement, at least in part, the security server 122, the secure resource 108, and/or the network(s) 110. The virtualized cloud architecture 700 is a shared infrastructure that can support multiple services and network applications. The illustrated virtualized cloud architecture 700 includes a hardware resource layer 702, a control layer 704, a virtual resource layer 706, and an application layer 708 that work together to perform operations as will be described in detail herein.

The hardware resource layer 702 provides hardware resources, which, in the illustrated embodiment, include one or more compute resources 710, one or more memory resources 712, and one or more other resources 714. The compute resource(s) 710 can include one or more hardware components that perform computations to process data, and/or to execute computer-executable instructions of one or more application programs, operating systems, and/or other software. The compute resources 710 can include one or more central processing units ("CPUs") configured with one or more processing cores. The compute resources 710 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 710 can include one or more discrete GPUs. In some other embodiments, the compute resources 710 can include CPU and GPU components that are configured in accordance with a co-processing CPU/GPU computing model, wherein the sequential part of an application executes on the CPU and the computationally-intensive part is accelerated by the GPU. The compute resources 710 can include one or more system-on-chip ("SoC") components along with one or more other components, including, for example, one or more of the memory resources 712, and/or one or more of the other resources 714. In some embodiments, the compute resources 710 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 710 can be or can include one or more hardware components architected in accordance with an advanced reduced instruction set computing ("RISC") machine ("ARM") architecture, available for license from ARM HOLDINGS. Alternatively, the compute resources 710 can be or can include one or more hardware components architected in accordance with an x86 architecture, such an architecture available from INTEL CORPORATION of Mountain View, Calif., and others. Those skilled in the art will appreciate the implementation of the compute resources 710 can utilize various computation architectures, and as such, the compute resources 710 should not be construed as being limited to any particular computation architecture or combination of computation architectures, including those explicitly disclosed herein.

The memory resource(s) 712 can include one or more hardware components that perform storage operations, including temporary or permanent storage operations. In some embodiments, the memory resource(s) 712 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 710.

The other resource(s) 714 can include any other hardware resources that can be utilized by the compute resources(s) 710 and/or the memory resource(s) 712 to perform operations described herein. The other resource(s) 714 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 716A-716N (also known as "hypervisors;" hereinafter "VMMs 716") operating within the control layer 704 to manage one or more virtual resources that reside in the virtual resource layer 706. The VMMs 716 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 710, the memory resources 712, the other resources 714, or any combination thereof. These abstractions are referred to herein as virtual machines ("VMs"). In the illustrated embodiment, the virtual resource layer 706 includes VMs 718A-718N (hereinafter "VMs 718"). Each of the VMs 718 can execute one or more applications 720A-720N in the application layer 708.

Based on the foregoing, it should be appreciated that aspects of network-assisted secure access has been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    obtaining, by a user device comprising a processor executing a network-assisted secure access application, first authentication data associated with a user who is attempting to access, via the user device, a secure resource;
    generating, by the user device, a message directed to the secure resource, wherein the message comprises the first authentication data and an indicator to notify the secure resource that a network-assisted secure access service will be used to assist in providing the user device secure access to the secure resource, and wherein the secure resource verifies the first authentication data;
    providing, by the user device, the message to the secure resource;
    receiving, by the user device, from the secure resource, a notification that the first authentication data has been verified by the secure resource;
    obtaining, by the user device, mobile connectivity data associated with the user device;
    generating, by the user device, an authentication request directed to a security server, wherein the authentication request comprises the mobile connectivity data to be verified by the security server;
    providing, by the user device, the authentication request to the security server that validates the mobile connectivity data against a fraud database;
    receiving, by the user device, from the security server, a security key, wherein receipt of the security key indicates that the security server has validated the mobile connectivity data against the fraud database, and wherein the security server also provides the security key to the secure resource;
    prompting, by the user device, the user to input second authentication data;
    providing, by the user device, the second authentication data to the secure resource;
    generating, by the user device, a verification request comprising the security key; and
    providing, by the user device, the verification request to the security server, wherein the security server verifies that the security key is valid and provides an acceptance notification to the secure resource to notify the secure resource to accept the second authentication data and grant the user device access to the secure resource.

2. The method of claim 1, wherein the first authentication data comprises a username and a password.

3. The method of claim 1, wherein the secure resource comprises a website.

4. The method of claim 1, wherein the network-assisted secure access application comprises a stand-alone application installed on the user device.

5. The method of claim 1, wherein the network-assisted secure access application is part of a resource access application designed to access the secure resource.

6. The method of claim 1, further comprising obtaining a user profile; wherein the authentication request further comprises the user profile to be verified by the security server.

7. The method of claim 1, further comprising:
obtaining, by the user device, updated mobile connectivity data; and
providing, by the user device, the updated mobile connectivity data to the security server, wherein the security server determines whether the updated mobile connectivity data can be validated against the fraud database and notifies the secure resource to maintain a connection with the user device if the updated mobile connectivity data can be validated against the fraud database.

8. A computer-readable storage medium comprising computer-executable instructions that, when executed by a processor, cause the processor to perform operations comprising:
obtaining first authentication data associated with a user who is attempting to access, via a user device, a secure resource;
generating a message directed to the secure resource, wherein the message comprises the first authentication data and an indicator to notify the secure resource that a network-assisted secure access service will be used to assist in providing the user device secure access to the secure resource, and wherein the secure resource verifies the first authentication data;
providing the message to the secure resource;
receiving, from the secure resource, a notification that the first authentication data has been verified by the secure resource;
obtaining mobile connectivity data associated with the user device;
generating an authentication request directed to a security server, wherein the authentication request comprises the mobile connectivity data to be verified by the security server;
providing the authentication request to the security server that validates the mobile connectivity data against a fraud database;
receiving, from the security server, a security key, wherein receipt of the security key indicates that the security server has validated the mobile connectivity data against the fraud database, and wherein the security server also provides the security key to the secure resource;
prompting the user to input second authentication data;
providing the second authentication data to the secure resource;
generating a verification request comprising the security key; and
providing the verification request to the security server, wherein the security server verifies that the security key is valid and provides an acceptance notification to the secure resource to notify the secure resource to accept the second authentication data and grant the user device access to the secure resource.

9. The computer-readable storage medium of claim 8, wherein the first authentication data comprises a username and a password.

10. The computer-readable storage medium of claim 8, wherein the secure resource comprises a website.

11. The computer-readable storage medium of claim 8, wherein the network-assisted secure access application comprises a stand-alone application installed on the user device.

12. The computer-readable storage medium of claim 8, wherein the network-assisted secure access application is part of a resource access application designed to access the secure resource.

13. The computer-readable storage medium of claim 8, wherein the operations further comprise obtaining a user profile; wherein the authentication request further comprises the user profile to be verified by the security server.

14. The computer-readable storage medium of claim 8, wherein the operations further comprise:
obtaining updated mobile connectivity data; and
providing the updated mobile connectivity data to the security server, wherein the security server determines whether the updated mobile connectivity data can be validated against the fraud database and notifies the secure resource to maintain a connection with the user device if the updated mobile connectivity data can be validated against the fraud database.

15. A user device comprising:
a processor; and
a memory comprising computer-executable instructions that, when executed by the processor, cause the processor to perform operations comprising
obtaining first authentication data associated with a user who is attempting to access, via the user device, a secure resource,
generating a message directed to the secure resource, wherein the message comprises the first authentication data and an indicator to notify the secure resource that a network-assisted secure access service will be used to assist in providing the user device secure access to the secure resource, and wherein the secure resource verifies the first authentication data,
providing the message to the secure resource,
receiving, from the secure resource, a notification that the first authentication data has been verified by the secure resource,
obtaining mobile connectivity data associated with the user device,
generating an authentication request directed to a security server, wherein the authentication request comprises the mobile connectivity data to be verified by the security server,
providing the authentication request to the security server that validates the mobile connectivity data against a fraud database,
receiving, from the security server, a security key, wherein receipt of the security key indicates that the security server has validated the mobile connectivity data against the fraud database, and wherein the security server also provides the security key to the secure resource,
prompting the user to input second authentication data,
providing the second authentication data to the secure resource, generating a verification request comprising the security key, and providing the verification request to the security server, wherein the security server verifies that the security key is valid and provides an acceptance notification to the secure resource to notify the secure resource to accept the second authentication data and grant the user device access to the secure resource.

16. The user device of claim 15, wherein the first authentication data comprises a username and a password.

17. The user device of claim 15, wherein the secure resource comprises a website.

18. The user device of claim 15, wherein the network-assisted secure access application comprises a stand-alone application installed on the user device.

19. The user device of claim 15, wherein the network-assisted secure access application is part of a resource access application designed to access the secure resource.

20. The user device of claim 15, wherein the operations further comprise obtaining a user profile; wherein the authentication request further comprises the user profile to be verified by the security server.

* * * * *